Patented Oct. 19, 1948

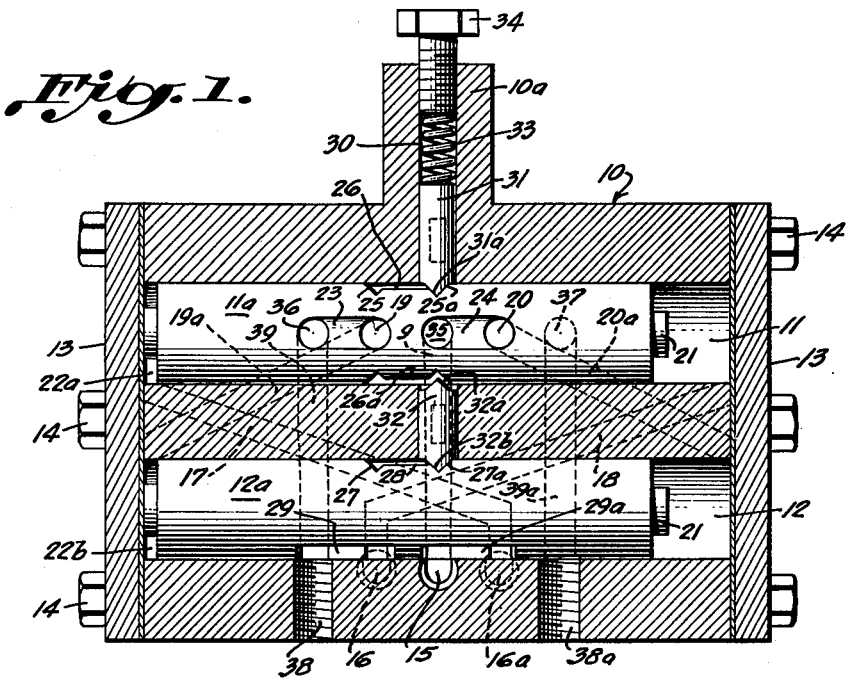

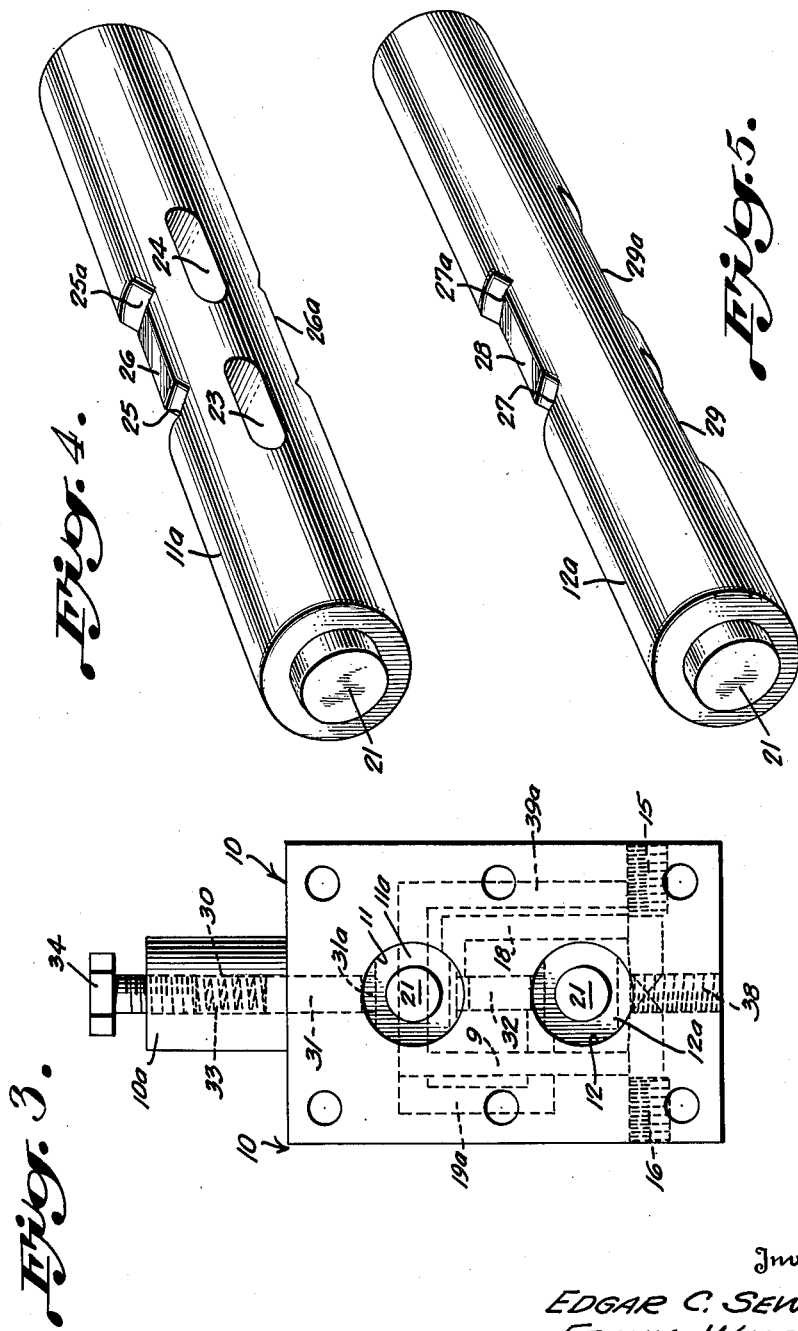

2,451,983

UNITED STATES PATENT OFFICE 2,451,983

FLUID ACTUATED PISTON DISTRIBUTING VALVE WITH FLUID ACTUATED PISTON PILOT VALVE FOR EXPANSIBLE CHAMBER MOTORS

Edgar C. Seward, Arlington, Va., and Frank Walcutt, Queens Village, N. Y.

Application April 9, 1945, Serial No. 587,390

3 Claims. (Cl. 121—158)

This invention relates to a hydraulic valve which is simple in construction and operation and which is designed to replace complicated and cumbersome mechanical drives with positive, hydraulic action. The invention is particularly adaptable in situations requiring continuous motion, whether reciprocating, oscillating or rotary. It is suitable for use in conjunction with pumps and continuous, reciprocating, double acting, cylinder motions on a closed circuit, in which it may operate one or more cylinders of varied length and diameter in parallel, or it may operate cylinders in series. The invention is particularly adaptable for operating shaker screens, stocker devices, shapers, presses, washing machines and the like.

Another object of the invention is the provision of a reversible valve, in which the valve may be reversed automatically at any desired pressure within the limits of its range.

A further object is the provision of a hydraulic valve which reduces to a minimum the possibility of damage to associated devices because, by reason of its construction, once the predetermined pressure is reached, the valve automatically reverses and then continues in operation until the predetermined pressure is again reached and the resistance of the fluid circuit builds up again. The motion is continuous.

Another object of the invention is the provision of such a valve having only a few simple, moving parts.

Still a further object is the provision of a dual piston, reversible hydraulic valve in which one of the pistons must complete its stroke before the other begins to move, providing surety of control and safety in operation, the reversing action of the valve being incomplete until both pistons have completed a stroke.

For a more complete understanding of the invention reference is made to the accompanying drawings and description which illustrate and exemplify a preferred embodiment of the invention, but which are not intended to limit the invention to the construction shown.

Figure 1 represents a central, longitudinal vertical section through the valve, showing the pistons thereof at the beginning or end of a cycle of operation.

Figure 2 is a view similar to that of Figure 1, showing the pistons in position after having completed one phase, or one-half cycle of operation.

Figure 3 is an end view of the valve shown in Figure 1 with an end plate removed, showing the cylinders and delineating the passages for the hydraulic fluid.

Figure 4 is a perspective view of the upper piston.

Figure 5 is a perspective view of the lower piston.

The valve embodies a casing 10, having spaced longitudinal cylinders 11, 12, which will be called primary and secondary cylinders, respectively, merely for convenience of description. The casing is closed at each end by plates 13 which are securely held in place by bolts 14. Each cylinder 11, 12, is provided with a primary piston 11a, and a secondary piston 12a, respectively. The casing has an inlet port 15 on one side leading to a suitable pump and ports 16, 16a leading to or from a working cylinder, according to the cycle of operation. Each cylinder is directly connected to a sump or reservoir (not shown) by means of passages and ports hereinafter described.

The cylinders 11 and 12 are interconnected by a series of ports and passages which delineate the working circuits of the valve. The left hand end of cylinder 11, or its pressure chamber in the phase of operation as shown in Figure 1, is connected to a cylinder 12 by means of passage 17. The right hand end of cylinder 11 is connected to cylinder 12 by means of passage 18. These cylinders are also connected by means of port 19, passage 19a and port 20, passage 20a, whose functions will be more fully described. A centrally located passage 9 connects cylinders 11 and 12 at one side of the bore 30. The diameter of each piston is reduced at 21 at each end so as to prevent the piston from closing off the cylinder and to provide a chamber 22a, 22b, 22c, 22d, in the cylinders adjacent the passages 17, 18, 19a, 20a, respectively. The piston 11a in the upper cylinder, as best shown in Figure 4, has a pair of longitudinally spaced, elongated slots 23, 24, milled or otherwise cut through its body, substantially along the line of its longitudinal axis and arranged substantially equidistant on each side of a line erected perpendicularly at a point midway between its ends. The surface of the piston is transversely reduced or notched as at 25, 25a, and a slight flat bearing surface 26 is ground or otherwise formed between the said notches so as to reduce said flat surface slightly below the circumference of the piston. Similar notches and a flat are formed at the diametrically opposite side of this piston.

The piston 12a, in Figure 5, is likewise notched at 27, 27a and has a slightly reduced flat bearing surface 28 between said notches. Opposite these notches, the body of the piston is milled out or otherwise cut away at spaced points to provide openings 29, 29a which are shown as substantially rectangular in side elevation.

As shown in Figure 1, the casing 10 has a boss 10a extending upwardly from one face. The boss and casing are provided with a vertical bore 30 which extends through each cylinder. Seated in this bore and suitably keyed therein to prevent rotation are two pins 31, 32, the pin 31 being formed at its lower end with a chisel point 31a to seat in one or the other of the notches 25, 25a, according to the phase of operation. This pin is maintained in yieldable relation to piston 11a by means of spring 33, the pressure of which is controlled by adjusting screw 34, or other suitable means.

The pin 32, which slides freely in the bore 30 is provided with a chisel point 32a, 32b at its upper and lower end, respectively, and normally rests with the chisel point 32b in the notch 27 or 27a of piston 12, according to the operation, which will now be explained.

The operation of the valve is as follows: Assuming the valve to be a working part of a hydraulic circuit in which a pump (not shown) delivers working fluid under pressure to the inlet 15, as shown in Figure 1, with the pin 31 adjusted for a predetermined working pressure by means of adjusting screw 34, in the first phase of operation the fluid under pressure flows from the inlet port 15, through the slot 29a in piston 12a into passage 17 and up to chamber 22a in left hand end of cylinder 11. Fluid pressure is simultaneously maintained through passage 9, port 35, slot 24, port 20 and passage 20a, with the right hand end of cylinder 12, holding piston 12a against left hand end of cylinder 12. When the pressure in chamber 22a, under the operation of the pump (not shown), builds up to the predetermined point where it is sufficient to overcome the resistance of the spring 33, the piston 11a will be kicked over to the right hand end of cylinder 11. As this takes place, the chisel point 31a of the pin 31 will be forced out of notch 25a by the working pressure of the fluid against the piston and the chisel point will ride over the flat surface 26 of piston 11a until it finds its seat in notch 25. This movement of the piston, as seen in Figure 2, shifted the slots 23, 24, so as to close port 36 and to open port 37. At the same time, the fluid in chamber 22c at the right hand end of cylinder 11 was forced into passage 18, slot 29 and discharged through outlet 38 (Figure 1) to a sump (not shown).

It is important to note that during the time the piston 11a was moving to the right, the piston 12a was positively locked against movement by means of the pin 32, the point 32b of which was maintained seated in notch 27a by the flat surface 26a of the piston 11a which was riding across the chisel point 32a.

With the piston 11a at the right hand end of the cylinder, (Figure 2) the direction of flow of the fluid changes after entering through inlet 15 and flows through passage 9, port 35 into slot 23, whence it passes through port 19, passage 19a to chamber 22b, until sufficient pressure is built up to overcome the resistance of pin 32, resting in notch 27a of the piston 12a. All chisel points and the corners of the notches in all pistons are rounded slightly so as to permit the pins to ride easily over them. When the pressure last referred to has overcome the resistance offered by pin 32, the piston 12a is kicked over to the right. This movement ends the second phase of operation and also accomplishes several functions.

First, the upward movement of the pin 32 as it rides over flat 28 has locked piston 11a against movement, as the chisel point 32a becomes seated in notch 25a and remains there until the lower end 32b has passed over the surface 28 of the piston 12a and drops into notch 27. This movement of piston 12a to the right forces fluid from chamber 22d through passage 20a, ports 20, slot 24, port 37 and passage 39a for discharge to the sump. Second, the connection between ports 15 and 16a has been broken by the shifting of the connecting opening or slot 29a. The operation of the valve has now been reversed. The hydraulic fluid entering inlet port 15 now passes through slot 29 to port 16 and thence through passage 18 to chamber 22c where, when pressure against the end face of piston 11a builds up to the predetermined point necessary to overcome the resistance of spring 33 and plunger 31, the piston will kick over to the left. Thereupon the procedure heretofore outlined is initiated in reverse and in a manner which will be understood by those skilled in the art, and pistons 11a and 12a will be moved, alternately, to the left. The valve will again have been reversed and a cycle of operation will have been completed.

It will thus be seen that the operation of the valve is accomplished in four phases. The first phase is accomplished by the shifting of one (primary) piston from one end of the cylinder to the other, while the other (secondary) piston is locked (by said primary piston and pin) against movement. The second phase begins when the first (primary) piston has completed its stroke and the other (secondary) piston moves to the other end of the cylinder, while simultaneously locking the first (primary) piston against movement. When these two phases are accomplished, one-half cycle of operation of the valve is completed. When the pistons return to the end of the cylinder where the cycle began, they complete two more phases, and thus one full cycle.

If, during the operation of the valve in a working circuit, the resistance builds up beyond the predetermined working pressure of the valve at the maximum limit, or if the pistons of the working cylinders (not shown) become locked in any part of their stroke, no damage will result, as the valve will automatically displace the working fluid by continuous rapid reversing.

While the pressure control medium has been shown as an adjustable screw and spring, the pressure control may be accomplished by other means as will be understood by those skilled in the art.

Other changes in the construction and design of the invention may be made, as will be well understood by those skilled in the art, without departing from the spirit of the invention as defined by the appended claim.

We claim as our invention:

1. A hydraulic reversing valve comprising a casing, a pair of bores in said casing, a piston in each of said bores and arranged to reciprocate therein, one of said pistons having a pair of longitudinally spaced elongated slots transversely provided therein and arranged to permit fluid flow individually therethrough, the other of said pistons having a pair of spaced recesses provided on a portion of the surface thereof and arranged to permit fluid flow individually therethrough, each of said bores having respective ports alternately communicable with said slots in said first piston and said recesses in said second piston as said pistons reciprocate, to permit fluid flow therethrough; a plurality of passages in said casing communicating with said ports, two such passages connecting two of the ports of said first bore with opposite ends of said second bore, two other of said passages connecting two of the ports of said second bore with opposite ends of said first bore, an additional two passages connecting two additional ports in said first bore with pressure outlets from said casing, and a passage connecting a port in each of said bores with a pressure inlet in said casing, said latter ports in each bore being located centrally of the other ports therein.

2. A fluid pressure reversing valve comprising in combination a casing having a pair of cylinders, primary and secondary piston valves mounted for reciprocation in said cylinders, a fluid pressure inlet connected to said primary and secondary cylinders, a pair of fluid pressure outlets in said secondary cylinder, said secondary piston having means for directing fluid from said inlet to one or the other of said outlets, said means also serving to direct fluid from said inlet to either end of said primary cylinder depending upon the position of said secondary piston whereby said primary piston will be selectively reciprocated, said primary piston having means for directing fluid from said inlets to either end of said secondary cylinder depending upon the position of said primary piston whereby said secondary piston will be selectively reciprocated, an adjustably loaded detent engaging said primary piston and constructed and arranged to prevent reciprocation thereof by fluid pressure in either end of said primary cylinder below a predetermined value and a single slidably mounted interlocking detent engaging said primary and secondary pistons constructed and arranged to prevent movement of one piston during movement of the other piston whereby the operation of said secondary piston will be positively controlled by the operation of said primary piston in response to a predetermined pressure at either of said outlets.

3. A fluid pressure reversing valve comprising in combination a casing having a pair of cylinders, primary and secondary piston valves mounted for reciprocation in said cylinders, a fluid pressure inlet connected to said primary and secondary cylinders, a pair of fluid pressure outlets in said secondary cylinder, said secondary piston having means for directing fluid from said inlet to one or the other of said outlets, said means also serving to direct fluid from said inlet to either end of said primary cylinder depending upon the position of said secondary piston whereby said primary piston will be selectively reciprocated, said primary piston having means for directing fluid from said inlet to either end of said secondary cylinder depending upon the position of said primary piston whereby said secondary piston will be selectively reciprocated, means engaging said primary piston for preventing reciprocation thereof by fluid pressure in either end of said primary cylinder below a predetermined value, and means engaging said primary and secondary pistons for preventing movement of one piston during movement of the other piston whereby the operation of said secondary piston will be positively controlled by the operation of said primary piston in response to a predetermined pressure at either of said outlets.

EDGAR C. SEWARD.
FRANK WALCUTT.

REFERENCES CITED

The following references are of record in the file of this patent:

UNITED STATES PATENTS

| Number | Name | Date |
| --- | --- | --- |
| 1,938,758 | Ernst | Dec. 12, 1933 |
| 1,952,690 | Strom | Mar. 27, 1934 |
| 2,027,171 | Hillis | Jan. 7, 1936 |
| 2,165,966 | Hall et al. | July 11, 1939 |
| 2,191,888 | Hillis | Feb. 27, 1940 |
| 2,264,375 | Hill et al. | Dec. 2, 1941 |